April 18, 1950     C. H. GRISS     2,504,831
APPARATUS FOR ENGRAVING GLASS
Filed Dec. 31, 1947     2 Sheets-Sheet 1
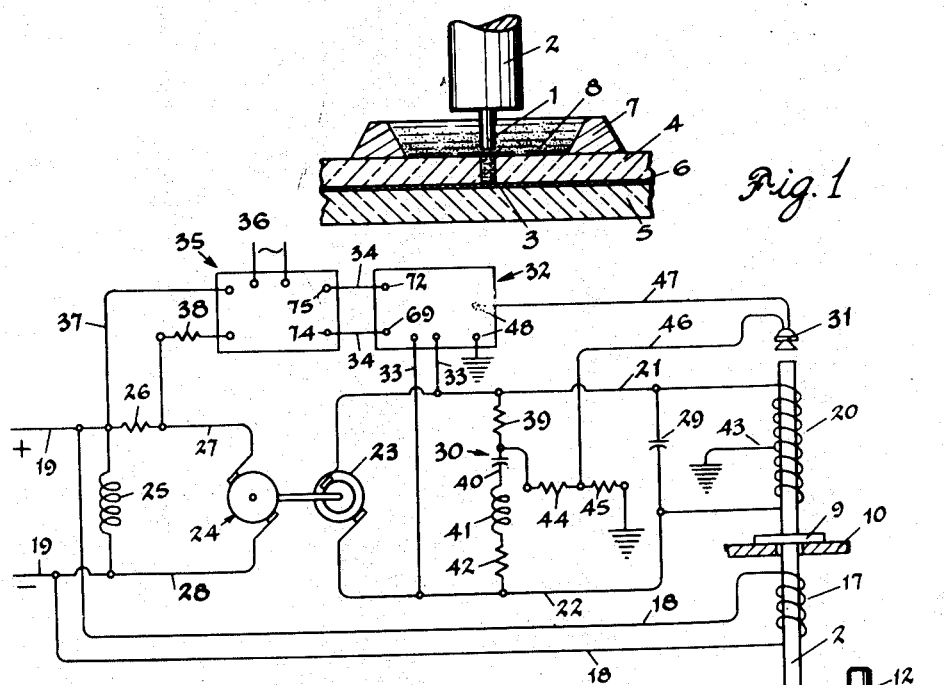
INVENTOR.
Charles H. Griss
BY
Nobbe & Swope
ATTORNEYS April 18, 1950            C. H. GRISS            2,504,831
APPARATUS FOR ENGRAVING GLASS
Filed Dec. 31, 1947            2 Sheets-Sheet 2

INVENTOR.
Charles H. Griss
BY Nobbe & Swope
ATTORNEYS

Patented Apr. 18, 1950

2,504,831

UNITED STATES PATENT OFFICE 2,504,831

APPARATUS FOR ENGRAVING GLASS

Charles H. Griss, Perrysburg, Ohio, assignor to Libbey-Owens-Ford Glass Company, Toledo, Ohio, a corporation of Ohio Application December 31, 1947, Serial No. 795,104

14 Claims. (Cl. 51—59)

This invention relates to glass cutting apparatus and in particular to an improved method of cutting and to apparatus that may be used for etching designs into the surface of a glass article or cutting entirely through a sheet of glass.

Glass, because of its extreme hardness, can be machined only by a grinding operation. The usual grinding medium is an extremely hard abrasive that is bonded or embedded into a relatively softer material either in the form of a grinding wheel or in the form of charged laps. The conventional grinding and polishing operations are easily carried out on the exterior surface of a piece of glass or on regular generally circular interior surfaces where the cutting may be done by a very small grinding wheel or a charged lap. These methods do not readily permit the cutting of non-circular holes or cavities.

The principal object of this invention is to provide a highly efficient glass cutting method in which the cutting is accomplished by an abrasive material carried in a liquid medium confined between the glass to be cut and the adjacent surface of a cutting tool.

Another object is to provide supervisory mechanism for keeping the source of power synchronized with the movement of the cutting tool so as to provide a highly efficient energy transfer from the source of power to the cutting medium interposed between the cutting tool and the glass or other substance to be cut.

These objects are attained by mounting a cutting tool on an elastic member that holds the tool juxtaposed to but not touching the surface of the glass to be cut and which elastic member is driven at a high amplitude of vibration so that the cutting tool is moved rapidly toward and away from the surface of the glass. The rapid vibratory movement of the tool is imparted to a cutting medium consisting of a finely divided abrasive carried in a liquid and interposed between the surface of the cutting tool and the glass. The resulting movement of the abrasive particles serves to cut away the glass immediately beneath the cutting tool.

Preferably the elastic member carrying the cutting tool is constructed of a magnetostrictive material and is maintained in vibration by subjecting it to an alternating magnetic field. The flux of the magnetic field is generated by driving coils that are connected to a suitable generator of alternating current. The frequency of the generator is controlled so that the periodic magnetic forces are in synchronism and phase with the vibratory movement of the elastic member with a result that high efficiency in the transfer of energy from the generator to the cutting tool is obtained. For high efficiency at high power levels it is preferable to use a rotating high-frequency alternator as a source of alternating current for energizing the driving coils of the vibrating elastic member.

The invention also contemplates the use of a frequency selective circuit as a coarse control of the speed of the alternator and of a phase sensitive circuit for comparing the vibratory movement of the elastic member with the phase of the alternator output voltage for maintaining the alternator voltage in step with the vibratory movement of the elastic member.

Where it is desired to operate at relatively high power levels to secure rapid cutting action it is preferable to employ a magnetostrictive rod as the elastic member and arrange the rod so that it vibrates longitudinally at its first mode of vibration. For control purposes the movement of the rod may be detected by means of a small microphone placed adjacent an end surface of the rod or by the use of any one of a number of vibration pickups that may be attached to the end of the rod and that convert its vibratory movement into a corresponding electrical voltage.

A preferred form of apparatus for carrying out the invention is illustrated in the accompanying drawings.

In the drawings:

Figure 1 is a fragmentary elevation showing the relationship of the cutting tool to the glass to be cut during the cutting operation.

Figure 2 is a schematic diagram of the improved glass cutting apparatus.

Figure 3 is a simplified schematic diagram of the essential elements of the supervisory control mechanism.

Figure 4 is a schematic diagram of a circuit for governing the speed of a motor driving the alternator according to a control signal developed in the supervisory control mechanism.

Figure 6:
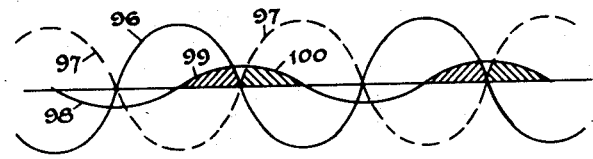
Figures 6 and 7 are diagrams in the nature of oscillograms to illustrate the action of the supervisory control mechanism.

These specific figures and the accompanying description are intended merely to illustrate the invention but not to impose limitations on the claims.

In Figure 1 the cutting tool 1 that is attached to the lower end of a magnetostrictive rod 2 is shown just above a hole 3 that it has cut through a sheet of glass 4. For support the glass sheet 4 may be backed by another sheet 5 from which it is separated by a thin layer 6 of a softer material that serves as a pressure equalizer. A dike 7 surrounding the area to be cut forms the wall to retain a cutting medium 8 over the area to be cut. The cutting medium 8 consists of an abrasive material such as "carborundum" powder carried in a liquid.

The cutting action is produced by a rapid vertical vibratory motion of the cutting tool 1 while the tool 1 is held juxtaposed to but not touching the surface of the glass to be cut. As the cutting action proceeds either the work, i. e. the glass plate 4, is raised or the tool is lowered to maintain the spacing between the end of the tool and the bottom of the hole being cut. The rapid vibratory movement of the tool 1 produces a rapid circulatory movement of the cutting medium 8 with the result that the abrasive material in the cutting medium grinds or scours away the glass immediately beneath the cutting tool thus cutting a hole into the glass the outline of which corresponds to the shape of the end of the cutting tool 1.

The rapid vibratory movement of the tool 1 attached to the lower end of the magnetostrictive rod 2 is produced by a longitudinal vibration of the rod. To facilitate the production of this vibration the rod is provided at its midpoint with a rubber collar 9 which collar rests on or is attached to a portion 10 of a supporting framework.

The glass sheet 4 being cut and its supporting sheet 5 rest on a table 11 that is guided for vertical motion by members 12 extending upwardly from a base 13. A cam 14 that is mounted on a shaft 15 may be rotated by manipulation of a handle 16 to raise the table 11 and thus advance the glass sheet 4 toward the cutting tool 1. This arrangement is satisfactory when the pieces of glass to be cut are relatively small. Should it be desired to cut or engrave larger sheets of glass, it is preferable to arrange the portion 10 of the framework carrying the magnetostrictive bar 2 so that the bar may be raised or lowered with respect to a stationary table supporting the glass sheet.

The apparatus for producing vibratory force within the magnetostrictive rod 2 consists of a coil 17 that is connected through leads 18 and 19 to a source of direct current voltage which serves to polarize the magnetostrictive rod 2 and a coil 20 that carries alternating current. The magnetic flux produced by alternating current flowing in a coil 20 combines with the flux produced by the direct current flowing in the coil 17 to produce a pulsating flux in the magnetostrictive rod 2 which, because of the magnetostrictive effect of the rod, produces changes in its length. If the changes in length occur at a frequency substantially equal to the resonant frequency of longitudinal vibration of the rod an intense vibratory motion of the rod is set up and practically all of the energy imparted to the rod by the alternating current flowing in the coil 20 is expended in overcoming the frictional losses within the rod and in supplying energy to the cutting medium located between the tool and the glass being cut.

Alternating current for the coil 20 is supplied through leads 21 and 22 that are connected to a high frequency alternator 23. The alternator is mechanically driven from a direct current motor 24 having a field coil 25 that is connected directly across the leads 19. Armature current for the motor 24 is drawn through a resistor 26 and leads 27 and 28.

A condenser 29 connected between the leads 21 and 22 serves to correct the lagging power factor of the coil 20 so that the load imposed on the alternator 23 is at substantially unity power factor. This is important to minimize the current flowing in the alternator for a given power output so that the alternator may operate at reasonably high efficiency.

In order to secure high efficiency in the transfer of power from the electrical circuit to the vibration in the magnetostrictive rod 2 it is necessary that the frequency of the alternating current be substantially equal to the natural period of vibration of the magnetostrictive rod 2. If the generator frequency differs widely from the resonant frequency the resulting movement of the magnetostrictive rod 2 is too small to be usable and practically all of the generator output is lost in overcoming the resistance of the circuit. In the improved apparatus a supervisory control is employed to hold the frequency of the alternator 23 at the resonant frequency of the magnetostrictive rod 2. This supervisory control includes a series-resonant circuit 30 connected between the alternator output leads 21 and 22 and a pickup device 31 which may be a microphone or a vibration pickup or any similar device capable of converting vibratory movement of the end of the magnetostrictive rod 2 into a corresponding electrical voltage. The signal voltage developed by the series-resonant circuit 30 and the microphone 31 is applied to a phase sensitive rectifier 32 which is also connected through leads 33 to the alternator output leads 21 and 22. The phase sensitive rectifier 32 combines the signal from the series-resonant circuit 30 and microphone 31 with the alternator output voltage and delivers to its output leads 34 a direct voltage the magnitude of which varies according to the difference between the alternator frequency and the natural frequency of the magnetostrictive rod 2.

The direct voltage from the phase sensitive rectifier 32 is applied to a grid controlled rectifier 35 that is supplied with current through leads 36 connected to a source of alternating current. One side of the output circuit of the rectifier 35 is connected through a lead 37 to the positive lead 19 of the direct current source of supply and the other output lead is connected through a resistor 38 to the lead 27 connecting the resistor 26 to the armature of the motor 24. In this circuit the output current of the grid controlled rectifier 35 flows through the resistor 26 (which is in series between the armature of the direct current motor and its source of direct current) and by varying the voltage drop across the resistor 26 regulates the speed of the motor 24 and thus the frequency of the alternator 23.

The series circuit 30 consists of a first resistor 39, a condenser 40, an inductance coil 41 and a second resistor 42. The resistor 39 is made equal in value to the sum of the resistance of the inductance coil 41 plus the resistor 42. The condenser 40 is selected so that it is in series resonance with the inductance coil 41 at a frequency equal to the resonant frequency of the magnetostrictive bar 2. Under this condition the reactive impedance of the condenser 40 cancels the reactive impedance of the coil 41 and current flow through the series conduit is determined by the resistors 39 and 42. Since the coil 20 carrying the alternating current from the alternator 23 has its center tap 43 connected to ground to balance the generator output with respect to ground, the voltage at the connection between the resistor 39 and condenser 40 is substantially zero with respect to ground when the condenser 40 resonates with the inductance coil 41. The junction between the resistor 39 and the condenser 40 is connected to ground through a voltage divider including resistors 44 and 45.

If the speed of the alternator rises so that its output frequency rises above the resonant frequency of the series circuit the lower branch of the series circuit including the condenser 40 and inductance coil 41 presents an inductive reactance and a voltage is applied to the voltage divider which voltage leads the alternator voltage by substantially 90° and has an amplitude generally proportional to the frequency difference between the generated frequency and the tuned frequency. If the alternator speed decreases, the lower branch of the series circuit 30 presents a capacitive reactance and a voltage is applied to the voltage divider which voltage lags substantially 90° behind the alternator voltage and again has an amplitude generally proportional to the frequency difference. The voltage output of the voltage divider which is taken from the connection between the resistors 44 and 45 is transmitted through a lead 46, the microphone 31 and a lead 47 to input terminals 48 of the phase sensitive rectifier 32.

As the frequency of the alternator 23 becomes nearly equal to the resonant frequency of the magnetostrictive bar 2, the signal from the series-resonant circuit diminishes while the amplitude of vibration of the bar increases and a voltage is generated in the microphone 31 that corresponds in amplitude and phase to the movement of the upper end of the bar 2. This combination of control results in a signal voltage being applied to the phase sensitive rectifier 32, which voltage is generally constant in amplitude and which varies in phase according to the direction of the error in frequency of the alternator 23 with reference to the resonant frequency of the bar 2.

Referring to Figure 3, which shows the essential elements of the phase sensitive rectifier 32, the leads 33 that are connected to the alternator output leads 21 and 22 are connected to a primary winding 49 of a transformer 50 that also has a center-tapped secondary winding 51. The ends of the secondary winding 51 are connected to plates 52 and 53 of vacuum tubes 54 and 55. Cathodes 56 and 57 of the vacuum tubes are connected together through series connected resistors 58 and 59 which are paralleled by condensers 60 and 61 respectively. The common connection between the resistors 58, 59 and condensers 60, 61 is connected through a lead 62 to the center tap of the secondary winding 51 of the transformer. Control grids 63 and 64 of the tubes 54 and 55 are connected together and through a current limiting resistor 65 to one end of a secondary winding 66 of a grid transformer 67. The other end of the secondary winding 66 is connected to the lead 62 that is connected to the center tap of the secondary winding 51 of the transformer 50. The grid transformer 67 has its primary 68 connected to the input terminals 48 of the phase sensitive rectifier 32 so that the signal voltage obtained from the series circuit 30 and the microphone or vibration pickup 31 flows through this winding.

The output of the phase sensitive rectifier 32 appears across the circuit connected to the cathodes 56 and 57 of the vacuum tubes. The cathode 57 of the tube 55 is connected directly to an output terminal 69 while the cathode 56 of the other tube is connected through a parallel combination of a resistor 70 and condenser 71 to the other output lead 72. The output leads 69 and 72 are connected together through a resistor 73. The combination of the resistors 70 and 73 acts as a voltage divider as long as the output voltage of the rectifier is not changing with time. When the output voltage is changing the voltage across the condenser 71 must change accordingly. The current to change the charge on the condenser 71 flows through the resistor 73 and this current flow produces a voltage drop across the resistor 73 which is generally proportional to the rate of change of the voltage appearing between the cathodes 56 and 57. The output voltage appearing between the leads 69 and 72 thus consists of two components: a first component which is proportional to the error in the frequency of the alternator 23 and a second component which is proportional to the rate of change of that error. The second component is required in order that the control system shall be stable and the alternator speed shall not fluctuate periodically above and below the desired operating speed.

The output leads 69 and 72 are connected to the leads 34, which in turn are connected to input terminals 74 and 75 of the grid-controlled rectifier 35. The terminal 74 is connected directly to the output terminal connected to the resistor 38 and also to cathodes 76 of a pair of grid-controlled gas-discharge rectifier tubes 77. Plates 78 of the rectifier tubes 77 are connected to the ends of a secondary winding 79 of a power transformer 80 having a primary 81 connected to a source of alternating current power. The input terminal 75 is connected directly to the center tap of a grid winding 82 of the transformer 80 the ends of which winding are connected through leads 83 to the corners of a bridge circuit 84. The bridge circuit 84 includes resistors 85 in two of its sides and condensers 86 in the other two of its sides. The corners of the bridge not connected to the grid winding 82 are connected through resistors 87 and 88 to grids 89 and 90 of the grid-controlled gas-discharge rectifier tubes 77. The resistors 87 and 88 serve to limit the grid current flow in the rectifier tubes while the bridge circuit 84 supplies a 90° phase shift with the grid voltage to the tubes lagging behind the plate voltage. This phase shift permits the conducting periods of the rectifier tubes 77 to be varied from zero conduction to full conduction by changing the direct current voltage between the terminals 74 and 75. The current passed by the grid controlled rectifier tubes 77 flows through the resistor 38 and the resistor 26 and back to the center tap of the secondary winding 79 of the transformer 80. This current flow in the resistor 26 is in opposition to the armature current flowing from the direct current source of supply through the resistor 26 and the armature of the motor 24. This current flow thus serves to regulate the armature voltage and thus the speed of the motor 24. The relative magnitudes of the resistors 26 and 38 may be varied to change the sensitivity of the control of the motor 24.

Figure 5:
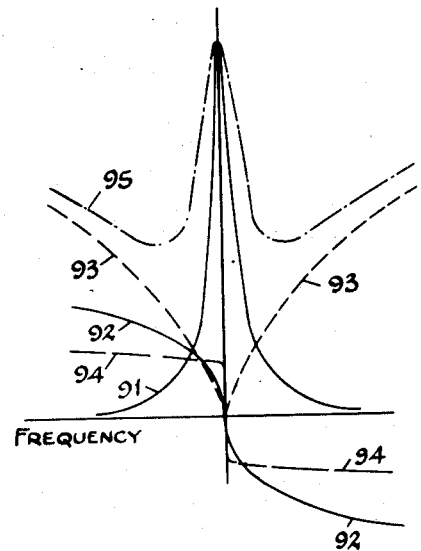
Figure 5 is a diagram in the nature of a graph to illustrate the frequency response characteristics of the various portions of the supervisory control mechanism.

Referring now to Figure 5, which is in the nature of a graph with frequency plotted along the horizontal axis, a curve 91 that rises to a sharp peak and then diminishes with increasing frequency represents the amplitude of vibration of a magnetostrictive bar 2 as the output voltage of the alternator 23 is maintained constant in amplitude but varying in frequency. The voltage generated in the microphone or other equivalent device is proportional in amplitude and phase to the motion of the bar and may, therefore, be represented by the same curve 91. The phase of the motion of the magnetostrictive bar 2 with respect to the voltage of the alternator 23 may be represented by a curve 92 which indicates that at lower frequencies the motion of the bar leads the voltage while at the resonant frequency the motion is in phase with the voltage and at higher frequency the motion lags behind the voltage.

The amplitude of the voltage delivered from the series-resonant circuit 30 to the voltage divider is represented by the dashed curve 93 which indicates that this voltage is of comparatively large magnitude when the frequency of the alternator 23 differs from the frequency of the bar 2 (to which frequency the circuit is tuned) and that this voltage practically disappears when the resonant frequency is reached. The phase of the voltage applied to the voltage divider from the series-resonant circuit 30 is shown by the dashed curve 94 and it will be seen that this voltage leads the alternator voltage when the frequency is below the resonant frequency and sharply changes to a lagging phase at the frequency at which the series circuit 30 is tuned. The curves in Figure 5 are shown assuming that the tuned frequency of the series-resonant circuit corresponds exactly to the resonant frequency of the magnetostrictive bar 2. The signal voltage applied to the phase sensitive rectifier 32 has an amplitude equal to the sum of the voltages developed by the series-resonant circuit 30 and the vibration pickup device or microphone 31. The amplitude of this sum is indicated by the dot-dash curve 95 of Figure 5. When the frequency of the alternator 23 is widely different from the resonant frequency the sum voltage represented by the curve 95 is made up almost entirely by the voltage derived from the series-resonant circuit 30 and as the frequency of the generator 23 approaches the resonant frequency of the magnetostrictive rod 2 the sum voltage contains a larger and larger component derived from the vibration pickup or microphone until right at the resonant frequency the signal applied to the phase sensitive rectifier 32 consists entirely of that derived from the microphone 31.

The advantage of this combination of sources of voltage for the supervisory control consists in the fact that the sum voltage is relatively constant in amplitude as compared to the amplitude of motion of the magnetostrictive rod 2 and that the phase of this voltage is relatively constant when the frequency differs widely from the resonant frequency and that it changes rapidly at the resonant frequency of the magnetostrictive rod. As a result, the supervisory control is able to detect and respond to large errors in frequency without having any of its circuits overloaded and is, furthermore, able to select the operating frequency which provides maximum energy transfer to the bar. In addition the supervisory control can follow the small changes in resonant frequency of the bar which occur with changes in the load applied to the bar.

Figure 7:
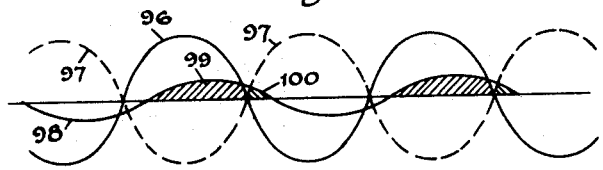

Figures 6 and 7 indicate the relationship that obtains between the signal voltage and the voltage from the alternator 23 which, after passing through the transformer 50, is applied to the plates 52 and 53 of the vacuum tubes 54 and 55. The voltage applied to the plate 52 is indicated by a sine curve 96 of Figures 6 and 7 while the voltage applied to the plate 53 is indicated by a dotted sine curve 97. The signal voltage applied to the grids 63 and 64, which is the voltage obtained from the series-resonant circuit 30 and microphone 31, is shown by a small amplitude sine curve 98. Current flows through either of the tubes 54 and 55 whenever the grid and plate of the tube are both positive with respect to the cathode. Thus the shaded areas 99 are representative of the current flow through the tube 54 while the shaded areas 100 are representative of the current flow through the tube 55. As long as these areas representing current flow are equal, which occurs when the grid voltage is 90° out of phase with the plate voltage indicating operation at the resonant frequency of the bar, there is no voltage difference between the cathodes 56 and 57 of the tubes and consequently no direct voltage applied to the leads 74 and 75 of the grid controlled rectifier 35.

Should the frequency of the alternator 23 drift away from the frequency of the magnetostrictive bar 2 or should the bar change its frequency with load the grid voltage represented by the curve 98 changes phase with respect to the plate voltage represented by the curves 96 and 97 so that the areas 99 and 100 are no longer equal, as is shown in Figure 7. The difference in current flow through the tubes results in a direct current voltage appearing between the cathodes 56 and 57 and this direct current voltage is applied to the grid-controlled gas-discharge rectifier 35 to change the current supplied to the armature resistor 26. This change in current affects the speed of the direct current motor in an amount sufficient to secure synchronism between the generator frequency and the resonant frequency of the bar.

This supervisory control circuit makes possible the efficient generation of large amounts of power for driving a vibratory glass cutting tool. In fact, the amount of power that may be applied to the cutting tool is limited only by the power handling capacity of the magnetostrictive rod 2. When operated at high power it is necessary to cool the coil 20 and the bar 2 in order to dissipate the heat generated by the losses therein. The coil may be cooled by immersing it in oil and the bar itself may be cooled by contact with either circulating oil or circulating water. Oil is preferred for the coil because of its insulating qualities.

Figure 8:
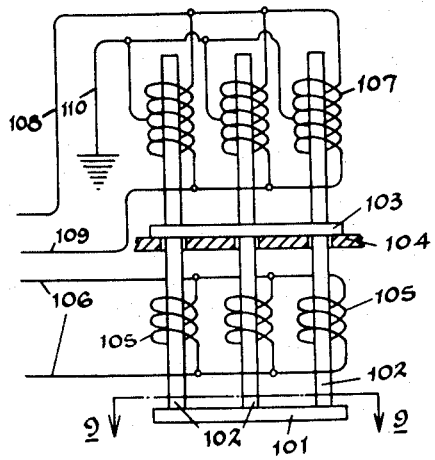
Figure 8 is an elevation, diagrammatic in character, of an alternative form of elastic driving member.

When designs are to be cut into the glass the size of the tool may become so great in area as to make it impractical to drive it with a single vibrating rod. Figure 8 is a diagrammatic illustration of a drive for a large cutting tool 101 the face of which is cut according to the pattern to be reproduced. The tool 101 is supported from the lower ends of a plurality of magnetostrictive rods 102 which are in turn resiliently supported by flexible collars 103 attached to their midpoints and resting on a portion 104 of a framework or other support. Energizing coils 105 carrying direct current supplied through leads 106 serve to magnetize the rods 102.

Driving coils 107 are connected through leads 108 and 109 to a source of alternating current such as the alternator 23. Each of the coils is center tapped and is connected to ground through a lead 110. This arrangement is satisfactory for driving large tools and the cutting action is satisfactory as long as the areas of the individual projecting portions of the tool 101 are kept relatively small. When a plurality of rods are joined to operate one tool, it is necessary that they be machined exactly so that they will vibrate in unison in response to alternating flux developed by the driving coils 107.

Figure 9:
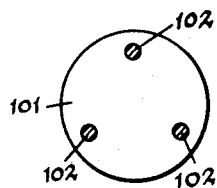
Figure 9 is a plan view of the alternative form of elastic driving member.

Figure 9 shows a preferred spacing of the driving rods 102 when there are three of them employed to drive the tool 101. Other configurations may of course be used since the only requirement is to divide the cutting load as evenly as possible between the various rods.

The improvement in efficiency accomplished by using a rotating alternator results from its inherently low losses. An alternator including the motor drive may have an overall efficiency of seventy to eight per cent which is considerably better than other methods of generating power in the frequency range between 5,000 and 15,000 cycles per second. The rotating machinery is less expensive in first cost than other generators particularly in the medium and high power sizes. The difficulty that has prevented the use of rotating generators in driving highly frequency-selective loads has been one of frequency control. This control is difficult from two standpoints. First, variations in power supply voltage cause excessive variations in generated frequency when continuously variable speed control is used. Synchronous motor drive is impractical because of lack of selection of the operating speed. Second, a frequency selective load tends to absorb the greatest power from the power source when it is operating at resonance. This means that small variations in speed cause large changes in load. The load change then reacts back on the speed. Such a system is unstable when operated near the resonant frequency of the load because a slight increase in speed decreases the load thus causing a further increase in speed. For stability the system must be operated well below the resonant frequency of the load. This results in such low overall efficiency that vacuum tube oscillators can compete on a commercial basis.

This disadvantage of the rotating generator is overcome by the inclusion of a supervisory control that maintains the generator frequency at the resonant frequency of the load.

Various combinations of elements may be used in constructing an apparatus to cut glass by means of a high frequency vibratory motion and the apparatus described illustrates a preferred method of accomplishing the result. The improved method of cutting glass by subjecting it to a scouring action of an abrasive carried in a liquid consists in the steps of providing a high efficiency generator for exciting high intensity vibrations in an elastic member to which a cutting tool is attached and of controlling the frequency of the generator to keep that frequency in agreement with the resonant frequency of the elastic member. The method also includes the steps of controlling the phase relationship between the generator and the motion of the elastic member in order that maximum energy transfer from the source to the elastic member may be obtained. The apparatus described constitutes a preferred form of apparatus for practicing the improved glass cutting method. This apparatus includes an alternator as representative of a high efficiency generator of alternating current and includes a supervisory control for maintaining the frequency of the alternator in agreement with the resonant frequency of an elastic member carrying the glass cutting tool. In this apparatus the phase sensitive rectifier and the microphone 31 or an equivalent vibration pickup constitutes means for performing the step of detecting the motion of elastic member and comparing it with the output of the generator to derive a control signal suitable for controlling the speed and thus the frequency of the generator that drives the elastic member.

Various modifications and substitution of elements may be made in constructing a glass cutter embodying the principles of the invention.

Having described the invention, I claim:

1. In a device for cutting glass, in combination, an elastic member that carries a tool juxtaposed to the glass to be cut, electromagnetic means for converting electrical power into mechanical vibration of said member, said member being resonant at a frequency that may vary with the load applied to the tool, a generator for supplying electrical power to the electromagnetic means, and control means responsive to the vibratory movement of the member for altering the frequency of the generator according to any change in resonant frequency of the member that may occur with change in load.

2. In a device for cutting glass, in combination, an elastic member that carries a tool juxtaposed to the glass to be cut, electromagnetic means for converting electrical power into mechanical vibration of said member, said member being resonant at a frequency that may vary with the load applied to the tool, a motor driven generator for supplying electrical power to the electromagnetic means, and control means responsive to the vibratory movement of the member for altering the frequency of the generator according to any change in resonant frequency of the member with change in load.

3. In a device for cutting glass, in combination, an elastic member that carries a tool juxtaposed to the glass to be cut, electromagnetic means for converting electrical power into mechanical vibration of said member, a motor driven generator for supplying electrical power to the electromagnetic means, and control means having a frequency selective portion independent said elastic member and a phase sensitive portion energized from said elastic member for maintaining the frequency of the generator equal to the resonant frequency of the elastic member.

4. In a device for cutting glass, in combination, an elastic rod that at one end carries a tool juxtaposed to the glass to be cut, electromagnetic means for converting electrical power into longitudinal vibration of the elastic rod, said rod being resonant at a frequency that may vary with the load applied to the tool, a motor driven generator for supplying power to the electromagnetic means, and control means responsive to longitudinal vibration of the rod for altering the frequency of the generator according to any change in resonant frequency of the rod with change in load.

5. In a device for cutting glass, in combination, a rod of magnetostrictive material, a cutting tool carried on an end of the rod, said rod being resonant at a frequency that may vary with the load on the cutting tool, a generator of electrical power, coils energized by said generator for varying the magnetization of the rod to excite vibration therein, a signal generator responsive to vibratory movement of the rod, and control means responsive to the signal generator for altering the frequency of the generator according to any changes in the resonant frequency of the rod with changes in load.

6. In a device for cutting glass, in combination, a rod of magnetostrictive material, a cutting tool carried on an end of the rod, said rod being resonant at a frequency that may vary with the load on the cutting tool, a motor driven generator, coils energized by the generator for varying the magnetization of the rod to excite vibration therein, means for operating the generator at a frequency generally equal to the resonant frequency of the rod, a motion detector for generating an electrical voltage proportional to vibratory movement of the rod, and control means responsive to said voltage for adjusting the generator operating means according to any changes in resonant frequency of the rod with changes in load.

7. In a device for cutting glass, in combination, a rod of magnetostrictive material, a cutting tool carried on an end of the rod, said rod having a natural frequency that may vary with load, a motor driven generator, coils energized by the generator for varying the magnetization of the rod to excite longitudinal vibration therein, and control means sensitive to the vibration of the rod for operating the generator with its frequency output substantially equal to the resonant frequency of the rod, whereby the rod is maintained at a high amplitude of vibration and a cutting medium interposed between the tool and the glass is agitated to erode the glass beneath the tool.

8. In a device for cutting glass, in combination, a rod of magnetostrictive material, a cutting tool carried on an end of the rod, a motor driven generator, coils energized by the generator for varying the magnetization of the rod to excite longitudinal vibration therein, and control means for maintaining the generator frequency equal to the resonant frequency of the rod, said control means including a series resonant electrical circuit for maintaining the generator frequency approximately correct, and a motion detector sensitive to movement of the rod for maintaining the generator output in selected phase relation with the rod.

9. In a device for cutting glass, in combination, a rod of highly elastic material, a tool carried on the end of the rod, said rod having a natural frequency that may vary with load, a suspension of a grinding compound in a liquid interposed between the tool and the glass to be cut, electromagnetic means for exciting vibration in the rod, a generator for supplying power to the electromagnetic means, and control means sensitive to the response of the rod for regulating the frequency of the generator.

10. In a device for cutting glass, in combination, a rod of highly elastic material, a tool carried on the end of the rod, said rod having a natural frequency that varies with load, a suspension of a grinding compound in a liquid interposed between the tool and the glass to be cut, electromagnetic means for exciting vibration in the rod and a generator and control therefor for supplying power to the electromagnetic means at a frequency that corresponds to the natural frequency of the rod under load.

11. In a device for cutting glass, in combination, a tool shaped according to a design to be produced, a highly elastic member for supporting the tool in juxtaposition to the area to be cut, a cutting medium comprising an abrasive carried in a liquid that covers the area to be cut and the face of the tool, electromagnetic means for exciting vibratory movement of the tool supporting member, and a source of electrical energy the frequency of which is continuously maintained equal to the loaded resonant frequency of the elastic member.

12. In a device for engraving glass, in combination, a tool shaped according to a design to be produced, a plurality of highly elastic members for supporting the tool in juxtaposition to the area to be cut, a cutting medium comprising an abrasive carried in a liquid that covers the area to be cut and the face of the tool, and electromagnetic means comprising electromagnetic coils and a source of controlled frequency power for exciting vibration in said elastic members.

13. In a device for engraving glass, in combination, a tool shaped according to a design to be produced, a plurality of parallelly arranged elastic members for supporting the tool in juxtaposition to the area to be cut, a cutting medium comprising an abrasive carried in a liquid that covers the area to be cut and the face of the tool, said elastic members being matched to vibrate in phase with each other, electromagnetic means for exciting vibration in the members, a generator for supplying power to the electromagnetic means and a control sensitive to the vibration of said members for holding the frequency of the generator equal to the resonant frequency of the elastic members.

14. In a device for engraving glass, in combination, a tool shaped according to a design to be produced, a plurality of highly elastic members for supporting the tool in juxtaposition to the area to be cut, a cutting medium comprising an abrasive suspended in a liquid covering the area to be cut and the face of the tool, electromagnetic means for exciting vibrations in the elastic members, a generator for supplying power to the electromagnetic means, and a control sensitive to variations to resonant frequency of the members for regulating the frequency of the generator.

CHARLES H. GRISS.

REFERENCES CITED

The following references are of record in the file of this patent:

UNITED STATES PATENTS

| Number | Name | Date |
| --- | --- | --- |
| 1,776,592 | MacDonald | Sept. 23, 1930 |
| 1,966,446 | Hayes | July 17, 1934 |
| 1,981,040 | Gullikson | Nov. 20, 1934 |
| 2,293,100 | Baumgold | Aug. 18, 1942 |
| 2,431,501 | Phillips | Nov. 25, 1947 |

FOREIGN PATENTS

| Number | Country | Date |
| --- | --- | --- |
| 553,176 | Great Britain | May 11, 1943 |

Certificate of Correction

Patent No. 2,504,831                                           April 18, 1950

CHARLES H. GRISS

It is hereby certified that error appears in the printed specification of the above numbered patent requiring correction as follows:

Column 12, line 50, for the words "variations to" read *variations in*;

and that the said Letters Patent should be read with this correction therein that the same may conform to the record of the case in the Patent Office.

Signed and sealed this 11th day of July, A. D. 1950.

[SEAL]

THOMAS F. MURPHY,
*Assistant Commissioner of Patents.*